Patented Aug. 1, 1950

2,517,091

UNITED STATES PATENT OFFICE 2,517,091

MONOPYRIDINIUM DERIVATIVES OF ESTERIFIED OXYALKYLATED DIPHENYLOL METHANES

Melvin De Groote, University City, and Bernhard Keiser, Webster Groves, Mo., assignors to Petrolite Corporation, Ltd., Wilmington, Del., a corporation of Delaware No Drawing. Original application April 2, 1945, Serial No. 586,266. Divided and this application November 26, 1945, Serial No. 630,973

5 Claims. (Cl. 260—295)

This invention relates to a new chemical compound or product and to the manufacture of same, our present application being a division of our pending application Serial No. 586,266, filed April 2, 1945, now Patent No. 2,430,000.

One object of our invention is to provide a new material or composition of matter, that is particularly adapted for use as a demulsifier in the resolution of crude oil emulsions, but which is also capable of use for various other purposes, or in various other arts.

Another object of our invention is to provide a practicable method for manufacturing or producing the new material or composition of matter above referred to.

The new material or composition of matter herein described consists of a hydrophile pyridinium compound of the formula:

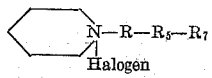

in which $R_5$ is a radical selected from the class consisting of methylene and hydrocarbon substituted methylene radicals having not over 7 carbon atoms; R is the radical obtained by the removal of an alpha hydrogen atom from the acid radical of a low molecular weight monocarboxy acid ester of a phenoxyalkanol of the formula:

$$R_1O(R_2O)_nH$$

in which $R_1$ is a substituted monocyclic phenyl radical having 2 of the 3 reactive 2, 4, 6 positions substituted by 2 alkyl side chains, of which at least one contains at least 3 carbon atoms and the longest of which does not contain more than 8 carbon atoms; $R_2O$ is an alkoxy radical selected from the class consisting of —$C_2H_4O$— and —$C_3H_6O$— radicals; and $n$ is a small whole number varying from 1 to 3; $R_7$ is the radical $$R_1O(R_2O)_{n'}H$$

with the proviso that $n'$ may vary from 0 to 3 in a manner identical with the value of $n$. More specifically, the ester, derived from a compound in which a methylene bridge or the like unites the residues of 2 phenoxyalkanols, includes alkanol radicals in which the carbon atom chain is interrupted at least once by oxygen, i. e., etheralkanols or etheralcohols. Alternatively, the methylene bridge may unite the residues of a phenoxyalkanol and a phenol, and thus, necessitating that the value of $n'$ include zero as well as 1, 2 or 3. As a matter of convenience, and especially for comparison with our copending application Serial No. 630,974, filed November 26, 1945, numerous illustrations will be concerned with the sub-genus, or where 2 phenoxyalkanol residues are present, and subsequently, there will be a more detailed consideration of the sub-genus in which there is one phenoxyalkanol residue and one phenol residue.

The herein contemplated procedure involves steps which convert a water-insoluble chemical compound into a water-soluble compound by conversion into a pyridinium salt. In some instances, it may be necessary to use enough oxyalkylating agent that $n$ or $n'$ may be as much as 6, instead of being limited to 3, in order to insure water solubility. Furthermore, it will subsequently be shown that one may conveniently react a diol of the kind contemplated as a reactant with one mole of a low molecular weight monocarboxy acid having not over 7 carbon atoms, such as acetic acid, butyric acid, propionic acid, or the like, and then subsequently oxyalkylate again prior to an esterification with chloroacetic acid. Thus, it is to be recognized that $R_7$ may not only represent the radical previously indicated, but may additionally represent 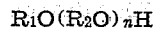 $R_1O(R_2O)_nOCR_8$ in which $R_8CO$ is the acyl radical of a monocarboxy acid having not over 7 carbon atoms.

In any event, the values of $n$ and $n'$ must be such as to insure at least incipient hydrophile properties in the final product.

More specifically, R in the first formula of the text represents the divalent radical by elimination of a nuclear hydrogen atom and a halogen from the ester of the formula:

in which all the symbols have their prior significance and $OCR_3$ Halogen is the acyl radical of a low molecular weight alpha chloromonocarboxy acid, such as chloroacetic acid. In other words, repeating the previous example with specific reference to chloroacetic acid, the formula becomes:

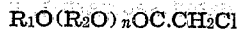

Briefly stated, the preparation of the herein contemplated compound consists of four steps: The first step consists in reacting 2 moles of a properly selected substituted phenol with one more of an aldehyde, so as to produce a diphenylolmethane or substituted methane. The preferred aldehyde is formaldehyde on account of its reactivity and low cost. Other aldehydes which may be used are acetaldehyde, propionaldehyde, butyraldehyde, and furfural. The condensation reactions of this type are well known and do not require description. In the case of furfural it is desirable to use alkaline condensing agents, but in the other instances acid or acidic substances are usually employed. Since these condensation reactions cannot produce resins in the usual sense, they are comparatively simple and result in oils varying from moderately viscous substances to oils so viscous as to appear to be almost solid.

The phenols are selected so that resinification does not take place, insofar that the phenols are limited to types in which there is only one reactive nuclear hydrogen atom. Specifically, then, the phenols may be indicated by the following formula:

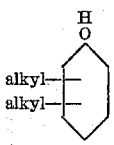

with the proviso that the 2 alkyl groups occupy 2 of the 2, 4, 6 positions, and that at least one of the alkyl side chains contains at least 3 carbon atoms, and the longest alkyl side chain does not contain more than 8 carbon atoms. When 2 moles of such phenol are condensed in the customary manner with a reactive aldehyde, one obtains a substituted diphenylol methane, or substituted methane of the following formula:

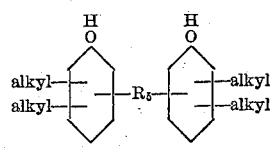

in which $R_5$ is a methyl radical, or a substituted radical selected from the class consisting of methylene and hydrocarbon substituted methylene radicals having not over 7 carbon atoms and is preferably the unsubstituted methylene radical derived from formaldehyde.

As to various suitable phenols, we prefer to use 2-4-diamyl phenol or p-tert-butyl-o-cresol. Other suitable phenols include

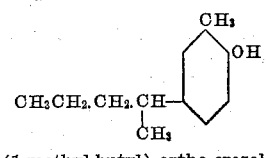

(1-methyl-butyl)-ortho-cresol

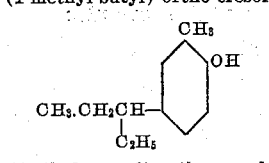

(1-ethyl-propyl)-ortho-cresol

See U. S. Patent No. 2,073,995, dated March 16, 1937, to Raiziss et al. See also U. S. Patent No. 2,106,750, dated February 1, 1938, to Raiziss et al.

Other phenols can be prepared by the alkylation of ortho- or paracresol by the same procedure as is employed for the alkylation of phenol. See U. S. Patent No. 2,060,573, dated November 10, 1936, to Hester.

We have found that 2,4-dipropylphenol is also an excellent raw material. See also U. S. Patents Nos. 2,064,885, dated December 22, 1936, to Carpenter; 2,104,412, dated January 4, 1938, to Buc; and 2,207,753, to Moyle et al., dated July 16, 1940.

It is understood that there is no objection to the presence of an additional alkyl radical, provided its presence still leaves a reactive nuclear hydrogen atom. Such alkyl radical, if present, is limited to radicals having not over 8 carbon atoms and must occupy one of the 3 or 5 positions. For all practical purposes, however, such compounds are derived from metacresol or similar homologues, and thus, for the sake of brevity in the hereto appended claims, such alkyl groups will be indicated as being in either the 3 position, or in the 5 position. However, it is understood that the 3 and 5 positions are the obvious equivalents. One such example would be the product obtained by the propylation of metacresol. The meta group does not occupy a reactive position, and its presence does not interfere with the subsequent reaction. In a few instances, compounds are obtainable where a cyclic radical may serve instead of an alkyl radical, for example, in 4-tert-butyl-2-phenylphenol or 4-tert-butyl-2-cyclohexylphenol.

Since the substituted phenols employed as reactants are invariably water-insoluble, and since formaldehyde, a water-soluble aldehyde, is the preferred reactant for introducing the methylene bridge or its equivalent, we have found it most desirable to employ the procedure described in U. S. Patent No. 2,330,217, dated September 28, 1943, to Hunn. Briefly stated, this procedure includes the use of an acid catalyst, along with an emulsifying agent to promote emulsification, and thus, reaction between the water-insoluble phenol and the water-soluble aldehyde. As an example of such procedure, the following is included:

PHENOL ALDEHYDE CONDENSATION

*Example 1*

| | Pounds |
|---|---|
| Diamyl(2,4) phenol | 702 |
| Formalin 40% U. S. P. | 114 |
| Concentrated hydrochloric acid | 3.3 |
| Alkylated aryl sulphonic acid salt (Nacconal N. R. S. F.) | 3.3 |

The mixture is stirred vigorously under a reflux condenser at approximately 105° C. for approximately 2 hours. The temperature is then raised to approximately 150–160° C. and held at this temperature for about the same period of time. Afterwards, water is distilled over and eliminated. Part of the water may be conveniently distilled over while the reaction mass is being raised from the temperature of approximately 105° C. to 150° C., or thereabouts, or while it is being held at approximately 150° C.

PHENOL ALDEHYDE CONDENSATION

*Example 2*

The same procedure is employed as in the previous example, except that 618 pounds of dipropyl(2,4) phenol replaces the 702 pounds of diamylphenol used in the preceding example.

PHENOL ALDEHYDE CONDENSATION

*Example 3*

The same procedure is followed as in the two previous examples, except that one uses a mixture consisting of 351 pounds of diamyl(2,4) phenol and 309 pounds of dipropyl(2,4) phenol. The result of such mixture is that the condensate is also a mixture, of which one-third corresponds to Example 1, preceding, one-third to Example 2, preceding, and the remaining third represents the type of compound in which the phenol nuclei are different, one being an amylated nucleus, and the other a propylated nucleus.

Instead of using the emulsification procedure, one may, of course, employ another well known method, to wit, the use of an alkaline catalyst in excess, particularly in amounts sufficient to dissolve or solubilize the water-insoluble phenol. Usually, a 10% sodium hydroxide solution is used to dissolve the substituted phenol. For complete details see, for example, Industrial and Engineering Chemistry, volume 30, No. 11, page 1009.

Due to ready availability, and other desirable properties, it is particularly convenient and economical to replace dipropyl(2,4) phenol with an equivalent amount of 4,6-di-tertiary-butyl-m-cresol, which is indicated by the following formula:

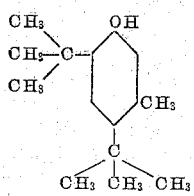

In the second step of the method of producing our new material or compound, a properly selected phenol of the kind typified by the formula:

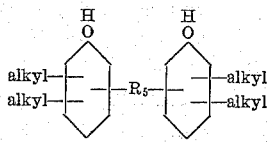

is treated with 2 to 6 moles of an oxyalkylating agent of the kind described, so as to produce a compound in which 2 phenoxyalkanols are united by a methylene bridge or hydrocarbon substituted methylene bridge, as described. In any event, one must have incipient hydrophile property, as previously mentioned and described in detail subsequently.

If one employs 2 moles of ethylene oxide, the reaction may be indicated in the following manner:

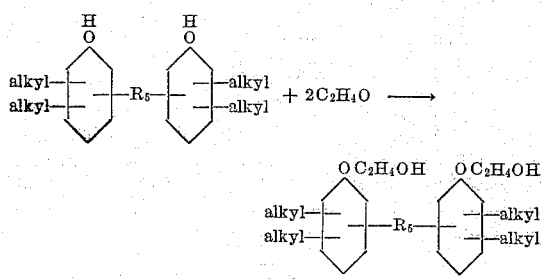

The third step of said method consists in esterifying the diol thus obtained with a suitable alpha-chloromonocarboxy acid, such as chloroacetic acid, to form the corresponding ester. This reaction may be illustrated in the following manner:

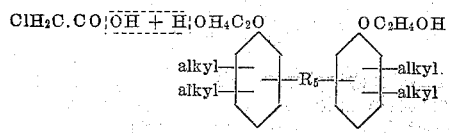

The final step of the method consists in reacting the ester so obtained with pyridine, or one of its homologues, as subsequently specified. Such reaction may be indicated in the following manner:

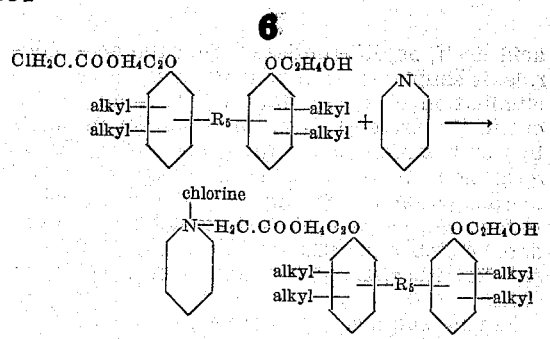

As suggested, one may not only use pyridine, but other homologues of pyridine, that is, members of the pyridine series. For instance, members of the pyridine series suitable as reactants include pyridine and methylated pyridine, i. e., pyridines in which one, two or three methyl groups have been substituted in the nucleus, such as picolines, lutidines and collidines. Coal tar bases represent mixtures of suitable heterocyclic materials which may be used as such, or after suitable purification, without separation into the individual components.

While chloroacetic acid or chloroacetyl chloride is the preferred halogen carboxylic acid compound, other halogen acids, halogen substituted acyl halides, and esterifying derivatives are suitable, particularly a-halogen carboxylic acids of not over three carbon atoms. When the halogen is in the a-position to the CO group, the reaction seems to go with greater readiness. With the shorter chain esterifying halogen carboxylic acids or their functional equivalents, especially chloroacetyl chloride, the reaction goes with great ease. Other halogen acylating compounds which are suitable are, for example, a-chlorpropionic acid, etc., but especially, any acid of the formula:

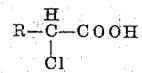

where R is a hydrogen atom or a methyl radical.

Treatment of water-insoluble phenols with alkylene oxides of the kind enumerated, i. e., with ethylene oxide and propylene oxide, is a well known procedure. Such compounds are frequently oxyethylated so as to render them water-soluble. In the present instance, instead of treating one mole of the selected phenol with a large ratio of oxyalkylating agent, one employs instead a comparatively low ratio, as indicated by the value for the letter $n$ in prior formulae. In other words, one treats the phenol with one mole, two moles or three moles of the oxyalkylating agent. The product so obtained is still distinctly water-insoluble, and this is also true of the ester derived therefrom. It is to be noted, however, that such water-insoluble product represents the initial oxyalkylation step in the same type of procedure employed to produce a water-soluble product. Thus, as an example of various patents which teach the oxyalkylation of water-insoluble phenols, including the stepwise addition of the oxyalkylating agent, attention is directed to the following: British Patent No. 470,181, British Patent No. 452,866, U. S. Patent No. 2,243,330, dated May 27, 1941, to De Groote and Keiser, and U. S. Patent No. 2,233,381, dated February 25, 1941, to De Groote and Keiser.

Having obtained the water-insoluble bis(phenoxyalkanol)methane, such product is esterified with chloroacetyl chloride, chloroacetic acid, bromoacetic acid, alpha-chloropropionic acid, or the like. Such reaction, particularly between the acid itself, as differentiated from the acyl chloride, is simply an esterification reaction with the elimination of water, and is preferably carried out in the presence of an inert solvent insoluble in water, which serves to remove the water of formation. Such procedure is illustrated by numerous patents, including the following: British Patent No. 500,765, U. S. Patent No. 1,732,392, dated October 22, 1929, to Wietzel, and U. S. Patent No. 2,264,759, dated December 2, 1941, to Jones.

Having obtained the diol monoester, it is only necessary to react such compound with pyridine or a C-linked methyl homologue of pyridine. This reaction takes place rapidly by refluxing in presence of an excess of pyridine, and subsequently removing the excess of pyridine which does not enter the reaction by distillation, and preferably, vacuum distillation. The herein described procedures are illustrated by the following examples:

DI(HYDROXYALKYLOXYPHENYL)METHANE

Example 1

One pound mole of the product described under the heading "Phenol Aldehyde Condensation, Example 1" is treated with 2 pound moles of ethylene oxide in presence of one-half of 1% of sodium methylate; as the reaction proceeds, the sodium methylate either dissolves, or is converted into a soluble compound by chemical combination. Reaction is conducted at approximately 125° C. and 100–200 pound gauge pressure for approximately 2½ to 4 hours until the reaction appears to be complete, as indicated by the pressure dropping to zero. The product so obtained may be indicated by the following formula:

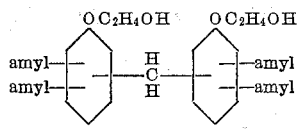

DI(HYDROXYALKYLOXYPHENYL)METHANE

Example 2

The same procedure is employed as in the preceding example, except that 4 pound moles of ethylene oxide are employed instead of 2 pound moles and the period of reaction is approximately fifty percent longer.

DI(HYDROXYALKYLOXYPHENYL)METHANE

Example 3

The same procedure is employed as in Example 1, preceding, except that 6 pound moles of ethylene oxide are employed instead of 2 pound moles, and the time of reaction is approximately twice that indicated in Example 1.

DI(HYDROXYALKYLOXYPHENYL)METHANE

Example 4

The same procedure is employed as in the three preceding examples, except that the propylated compound described under the heading "Phenol Aldehyde Condensation, Example 2" is substituted for the amylated derivative employed in the three preceding examples.

DI(HYDROXYALKYLOXYPHENYL)METHANE

Example 5

The same procedure is employed as in Examples 1 to 4, preceding, except that propylene oxide is substituted for ethylene oxide.

Previous reference has been made to the fact that the esterification step is carried out in the conventional manner, preferably in the presence of an inert solvent. This simply means that the reactants, to wit, the acid, such as chloroacetic acid, and the bis(phenoxyalkanol)methane, are mixed in equimolar proportions, in presence of a solvent in which both are soluble, such as xylene, cymene, decalin, or the like. The mixture is refluxed at some suitable temperature, above 100° C. and below 200° C., so that water of formation resulting from the esterification reaction is carried over as a constant boiling mixture. Such mixed vapor is condensed in the customary manner so the water is trapped off, measured, and then discarded and the solvent returned to the reaction vessel for further use. Ordinarily, such reactions are catalyzed by the addition of an acidic catalyst, such as toluene sulfonic acid, a cresyl phosphoric acid, dry hydrochloric acid, trichloroacetic acid, or the like. Insofar that the alpha-chlorocarboxy acids show marked acidity in comparison with the unchlorinated carboxy acids, the reaction may be conducted without an added catalyst, if desired, or in the presence of an added catalyst, such as ½% to 1% of toluene sulfonic acid. Such catalyst tends to discolor the final product, but this is often immaterial, as for example, when the product is used as a demulsifier. The entire procedure is too well known to require further elaboration, but is illustrated by the following examples:

ESTER

Example 1

One pound mole of the compound described under the heading "Di(hydroxyalkyloxyphenyl)methane, Example 1," preceding, is mixed with 1 pound mole of chloroacetic acid, and the mixture refluxed in presence of xylene equivalent to about 50% by volume of the reaction mass, with an appropriate trap for removal of 1 pound mole of water, at a temperature of approximately 155° to 225° C. The time required is usually 3 to 10 hours. The resultant is a dark colored viscous liquid.

ESTER

Example 2

The same procedure is followed as in the preceding example, except that the di(hydroxyalkyloxyphenyl)methanes prepared as described under the headings of Examples 2, 3, 4 and 5, are substituted for the compound employed in the previous example.

ESTER

Example 3

The same procedure is employed as in the two preceding examples, except that a-chloropropionic acid is substituted for a-chloroacetic acid.

ESTER

Example 4

Chloroacetylchloride is substituted for the chloroacetic acid employed in Ester, Example 1. The reaction starts to take place rapidly between 45° C. and 80° C. and the temperature should be controlled so the reaction takes place at the lowest suitable temperature. The acylchloride should be added slowly to the di(hydroxyalkyloxyphenyl)methane with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

In the preceding procedures the ester was obtained by reacting a single mole of a di(hydroxyalkyloxyphenol)methane with one mole of chloroacetic acid, or its equivalent. Actually, instead of using a di(hydroxyalkyloxyphenyl)methane, as previously described, one could have employed instead a hydroxyalkyloxyphenyl phenylol methane. To produce such a product, all that is required is to treat the phenol aldehyde condensation, as previously prepared, with one mole of an oxyalkylating agent instead of 2 moles. This is illustrated by the following examples:

HYDROXYALKYLOXYPHENYL PHENYLOL METHANE

Example 1

One pound mole of the product described under the heading "Phenol Aldehyde Condensation, Example 1" is treated with 1 pound mole of ethylene oxide in presence of one-half of 1% of sodium methylate; as the reaction proceeds, the sodium methylate either dissolves or is converted into a soluble compound by chemical combination. Reaction is conducted at approximately 125° C. and 100–200 pound gauge pressure for approximately 2½ to 4 hours, until the reaction appears to be complete, as indicated by the pressure dropping to zero. The product so obtained may be indicated by the following formula:

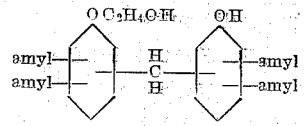

HYDROXYALKYLOXYPHENYL PHENYLOL METHANE

Example 2

The same procedure is employed as in the immediately preceding Example 1, except that propylene oxide is employed instead of ethylene oxide.

The same procedure is employed as in Example 1, except that butylene oxide is employed instead of ethylene oxide.

HYDROXYALKYLOXYPHENYL PHENYLOL METHANE

Example 3

The same procedure is employed as in the two preceding examples, except that the propylated compound described under the heading "Phenol Aldehyde Condensation, Example 2" is substituted for the amylated derivative employed in the two preceding examples.

Having obtained such monohydric alcohol instead of a diol, esterification is substantially the same as if a diol were employed, insofar that the proportion of reactants are still mole for mole. This is illustrated briefly in the following manner:

ESTER

Example 5

One pound mole of the compound described under the heading "Hydroxyalkyloxyphenyl Phenylol Methane, Example 1," preceding, is mixed with 1 pound mole of chloroacetic acid and the mixture refluxed with an appropriate trap for removal of 1 pound mole of water, at a temperature of approximately 155° to 225° C. The time required is usually 3 to 10 hours. The resultant is a dark colored viscous liquid.

ESTER

Example 6

The same procedure is followed as in preceding Example 5, except that hydroxyalkyloxyphenyl phenylol methane, as described under the headings of Examples 2 and 3, are substituted for the compound employed in the previous Example 5.

ESTER

Example 7

The same procedure is followed as in the two preceding Examples 5 and 6, except that a-chloropropionic acid is substituted for a-chloroacetic acid.

ESTER

Example 8

Chloroacetylchloride is substituted for the chloroacetic acid employed in Ester, Example 5. The reaction starts to take place rapidly between 45° C. and 80° C. and the temperature should be controlled so that the reaction takes place at the lowest suitable temperature. The acylchloride should be added slowly to the hydroxyalkyloxyphenyl phenylol methane with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices or controlled slow addition of the acyl chloride. Completeness of the reaction can be determined in any suitable manner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

Earlier reference was made to the fact that the diol might be esterified mole for mole with a low molecular weight monocarboxy acid or its equivalent, such as the acyl chloride having not over 7 carbon atoms. Such procedure may be illustrated in the following manner:

ACYLATED DI(HYDROXYALKYLOXYPHENYL)METHANE

Example 1

One pound mole of the material described under the heading "Di(hydroxyalkyloxyphenyl)-methane, Example 1," is reacted with one pound mole of acetic acid so as to produce a fractional ester. This may illustrated in the following manner:

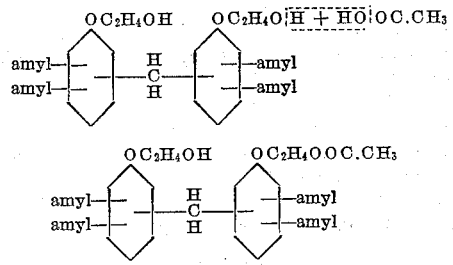

ACYLATED DI(HYDROXYALKYLOXYPHENYL)METHANE

Example 2

The same procedure is employed as in immediately preceding Example 1, except that the substituted methanes described under the heading "Di(hydroxyalkyloxyphenyl)methane, Examples 2 to 5," are substituted for the material employed in the said preceding Example 1.

ACYLATED DI(HYDROXYALKYLOXYPHENYL)METHANE

Example 3

The same procedure is employed as in the previous examples, except that acetic acid is replaced with propionic acid or butyric acid.

Acylated derivatives of the kind described immediately preceding, may be subjected to further oxyethylation so as to introduce 1 or 2 more alkylene oxide radicals. The result of such procedure results in unsymmetrical oxyalkylation, in the sense that the compound is not symmetrical in respect to the distribution of the alkylene oxide radicals. Such derivatives can be subjected to reaction with chloroacetic acid, or similar reactants, in the same manner as the acylated di(hydroxyalkyloxyphenyl)methane, previously described. The last mentioned esters are illustrated in the following manner:

ESTER

Example 9

One pound mole of the compound described under the heading "Acylated di(hydroxyalkyloxyphenyl)methane, Example 1," preceding, is mixed with 1 pound mole of chloroacetic acid and the mixture refluxed with an appropriate trap for removal of 1 pound mole of water, at a temperature of approximately 155° to 223° C. The time required is usually 3 to 10 hours. The resultant is a dark colored viscous liquid.

ESTER

Example 10

The same procedure is followed as in the preceding examples, except that acylated di(hydroxyalkyloxyphenyl)methane prepared as described under the headings "Acylated Di(hydroxyalkyloxyphenyl)methane, Examples 2 and 3," preceding, is substituted for the compound employed in the previous example.

ESTER

Example 11

The same procedure is employed as in the two preceding examples, except that a-chloropropionic acid is substituted for a-chloroacetic acid.

ESTER

Example 12

Chloroacetylchloride is substituted for the chloroacetic acid employed in Ester, Example 9. The reaction starts to take place rapidly between 45° C. and 80° C., and the temperature should be controlled so that the reaction takes place at the lowest suitable temperature. The acylchloride should be added slowly to the acylated di(hydroxyalkyloxyphenyl)methane with constant and vigorous stirring. Hydrochloric acid is formed and should be vented and disposed of in a suitable manner. If the reaction does not take place promptly, the temperature should be raised moderately, for instance, 5° to 15° C., or a bit higher, until the reaction proceeds smoothly. However, as soon as the reaction does start, the temperature should be lowered until the reaction proceeds at the slowest feasible rate. Generally, this means use of proper cooling devices, or controlled slow addition of the acyl chloride. Completeness of the reaction can be determined in any suitable monner, such as a check on the amount of hydrochloric acid eliminated, or the drop in hydroxyl value of the reactant mixture. When the reaction is complete, any hydrochloric acid gas dissolved in the reaction mass should be eliminated by passing an inert gas, such as carbon dioxide, through the mixture.

Having obtained an ester of the kind exemplified by the previous examples, or the bromo derivative, instead of the chloro derivatives, the next step simply involves reaction with pyridine, or a pyridine homolog of the kind previously described. The reaction takes place fairly rapidly, and usually, is complete within 4 to 20 hours, particularly if an excess of pyridine is employed. The esters previously described are invariably viscous or semi-solid masses which are soluble in pyridine without difficulty.

PYRIDINIUM HALIDE

Example 1

One pound mole of the ester described in Example 1, preceding, is refluxed with constant stirring with several pound moles, for example, four to six, of technically pure pyridine. The reaction is conducted from approximately 4 to 20 hours at a temperature in excess of 115° C., or thereabouts, until reaction is complete. Completeness of the reaction can be determined by distilling the uncombined pyridine from a sample and noting by difference percentage of pyridine which has been combined. Another suitable test is the determination of ionizable halogen, for instance, chlorine. It is to be noted that the reaction converts a non-ionizable halogen atom to an ionizable atom. When the reaction is complete, the excess of pyridine is removed by continuing the stirring and employing vacuum, so as to give a substantially solid or highly viscous dark colored mass. This reaction product should have hydrophile properties, whether hard or soft, and should be particularly effective as a surface tension depressant, even in very low concentrations.

Such compound conforms to the following formula:

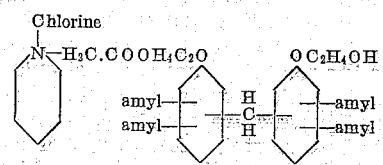

PYRIDINIUM HALIDE

Example 2

The same procedure is followed as in Example 1, preceding, except an ester exemplified by "Ester, Example 2" and "Ester, Example 3," preceding, is substituted for the ester employed in the preceding Example 1.

PYRIDINIUM HALIDE

Example 3

The same procedure is followed as in the two immediately preceding examples, but instead of using technically pure pyridine, one employs a commercial pyridine in which there is present some monomethylpyridine and dimethylpyridine in addition to unsubstituted pyridine.

PYRIDINIUM HALIDE

Example 4

The same procedure is followed as in "Pyridinium Halide, Example 1," preceding, except that the compound subjected to reaction with pyridine is a hydroxyalkyloxyphenyl phenylol methane derivative, as described under the heading "Hydroxyalkyloxyphenyl Phenylol Methane, Example 1," and converted into an ester in the manner described under the heading "Ester, Example 5." The compound so obtained is indicated by the following structure:

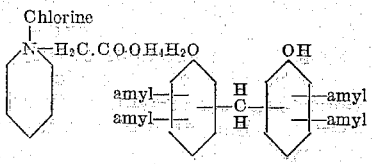

PYRIDINIUM HALIDE

Example 5

The same procedure is followed as in preceding "Pyridinium Halide, Example 4," except that instead of using "Ester, Example 5," as a reactant, one employs instead "Ester, Example 6," or "Ester, Example 7."

PYRIDINIUM HALIDE

Example 6

The same procedure is followed as in "Pyridinium Halide," Examples 4 and 5, immediately preceding, but instead of using technically pure pyridine, one employs a commercial pyridine in which there is present some monoethylpyridine and dimethylpyridine in addition to unsubstituted pyridine.

PYRIDINIUM HALIDE

Example 7

The same procedure is followed as in "Pyridinium Halide, Example 1" or "Pyridinium Halide, Example 4," except that the reactant is a compound derived from an acylated di(hydroxyalkyloxyphenyl) methane, which has been converted into an ester, as exemplified by "Ester, Example 9." The compound so obtained has the following structure:

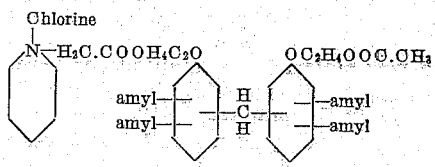

PYRIDINIUM HALIDE

Example 8

The same procedure is followed as in Example 7, preceding, except that one employs instead, ester of Example 10 or Example 11.

PYRIDINIUM HALIDE

Example 9

The same procedure is followed as in the two examples immediately preceding, but instead of using technically pure pyridine, one employs a commercial pyridine in which there is present some monoethylpyridine and dimethylpyridine in addition to unsubstituted pyridine.

PYRIDINIUM HALIDE

Example 10

The same procedure is followed as in the three examples immediately preceding, except that one employs reactants involving unsymmetrical oxyethylation or unsymmetrical alkylation, as described in the paragraph immediately following the heading "Acylated Di(hydroxyalkyloxyphenyl)methane, Example 3."

It is to be emphasized that all of the products herein contemplated are water-dispersible, or at least, produce a colloidal sol after reaction with pyridine or pyridine homolog. The reactants, prior to such procedure, are not water-soluble. The compounds contemplated vary from fairly viscous liquids to semi-solids and solids. When produced in either glass or iron vessels, they invariably have a dark amber color.

In summary then, the herein contemplated compounds may be indicated by the following structural formula:

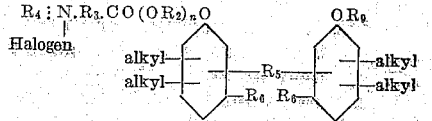

in which $R_2O$ is an alkoxy radical selected from the class consisting of $—C_2H_4O—$ and $—C_3H_6O—$ radicals; $n$ is a small whole number varying from 1 to 3; $OC.R_3$ is the acyl radical of a low molecular weight monocarboxy acid having not more than 3 carbon atoms in which an alpha-hydrogen atom has been removed; $N:R_4$ represents a radical of a heterocylic compound of the pyridine series selected from the group consisting of pyridine and C-linked methyl homologues of pyridine; $R_5$ is a radical selected from the class consisting of methylene and hydrocarbon substituted methylene radicals having not over 7 carbon atoms; $R_6$ is a member of the class consisting of hydrogen atoms and alkyl radicals having not over 8 carbon atoms, the phenolic residues being substituted monocylic phenol radicals having two of the three reactive 2, 4, 6 positions substituted by two alkyl side chains, of which at least one contains at least three carbon atoms, and the longest of which does not contain more than 8 carbon atoms; $R_9$ is selected from the class consisting of hydrogen atoms, $(R_2O)_nH$ radicals and $(R_2O)_n.OCR_3$ radicals, in which $R_2O$ and $n$ have their prior significance and $R_3CO$ is the acyl radical of a monocarboxy acid having not over 7 carbon atoms.

The new materials or compositions herein described are useful as wetting, detergent and leveling agents in the laundry, textile, and dyeing industries; as wetting agents and detergents in the acid washing of fruit, in the acid washing of building stone and brick; as a wetting agent and spreader in the application of asphalt in road building and the like, as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive, as far as industrial application goes, although the most important use of our new material is as a demulsifier, for water-in-oil emulsions, and more specifically, emulsions of water or brine in crude petroleum.

We have found that the chemical compounds herein described which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

The new compounds herein described are of utility, not only for the purposes specifically enumerated in detail, but they also find application in various other industries, processes, and for various uses where wetting agents of the conventional type are used. As to some of such additional uses which are well known, see "The Expanding Application of Wetting Agents," Chemical Industries volume 48, page 324 (1941).

Another use for the compounds herein contemplated is in the prevention of landslides, as described in U. S. Patent No. 2,348,458, dated May 9, 1944, to Endersby.

In many instances, the materials obtained, rather than being characterized as a viscous semi-solid, probably should be referred to as tacky sub-resin or tacky resin. The aldehyde condensate, particularly when derived from formaldehyde, shows not only viscosity, but tackiness approaching or actually in the stringy state. This particular property is usually enhanced after conversion into a pyridinium compound. This enhancement applies usually to both the stringy character and the resinous character. Such change appears to be imparted by the fact that the large molecular structure still exists, but in addition, an ionic structure has been superimposed on the somewhat unusual molecular structure. This ionic structure naturally acts the same as such structure would act in an ordinary inorganic salt crystal. One result of such peculiarity is, that sometimes water solubility may be obscured. For instance, tests have been indicated previously which are employed to show when the reaction with pyridine has gone to completion. On completion, the structure of the resultant may be so resinous and so tacky, that it shows a very slow rate of solubility in water. Thus, a test may at first sight indicate the product is still water-insoluble, whereas, it is actually water-soluble, or at least, self-emulsifiable. To guard against such possible error, it is well to take a small amount of the reaction mass and reflux it with an excess of water, or better still, dissolve the reaction mass by warming in methyl alcohol and then dilute with an excess of water.

Attention is directed to our co-pending applications for patent Serial Nos. 586,262, 586,263, 586,266 and 586,267, all filed Apr. 2, 1945, and all issued November 4, 1947, as Patents Nos. 2,429,996, 2,429,997, 2,430,000 and 2,430,001, respectively.

Having thus described our invention, what we claim as new and desire to secure by Letters Patent is:

1. A hydrophile chemical compound of the formula:

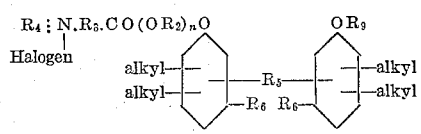

in which $R_2O$ is an alkoxy radical selected from the class consisting of —$C_2H_4O$— and —$C_3H_6O$— radicals; $n$ is a small whole number varying from 1 to 3; $OC.R_3$ is the acyl radical of a low molecular weight monocarboxy acid having not more than 3 carbon atoms, in which an alpha-hydrogen atom has been removed; $N:R_4$ represents a radical of a heterocyclic compound of the pyridine series selected from the group consisting of pyridine and C-linked methyl homologues of pyridine; $R_5$ is a radical selected from the class consisting of methylene and hydrocarbon substituted methylene radicals having not over 7 carbon atoms; $R_6$ is a member of the class consisting of hydrogen atoms and alkyl radicals having not over 8 carbon atoms, the phenolic residues being substituted monocyclic phenol radicals having two of the three reactive 2,4,6 positions substituted by two alkyl side chains, of which at least one contains at least three carbon atoms, and the longest of which does not contain more than 8 carbon atoms; $R_9$ is selected from the class consisting of hydrogen atoms, $(R_2O)_nH$ radicals and $(R_2O)_nOCR_3$ radicals, in which $R_2O$ and $n$ have their prior significance and $R_3CO$ is the acyl radical of a monocarboxy acid having not over 7 carbon atoms.

2. The compound of claim 1, wherein the halogen is chlorine.

3. The compound of claim 1, wherein the halogen is chlorine and $n$ is one.

4. The compound of claim 1, wherein the halogen is chlorine, $n$ is one, and the alkoxy radical is —$C_2H_4O$—.

5. The compound of claim 1, wherein the halogen is chlorine, $n$ is one, the alkoxy radical is —$C_2H_4O$—, and all alkyl radicals are amyl radicals.

MELVIN DE GROOTE.
BERNHARD KEISER.

REFERENCES CITED

The following references are of record in the file of this patent:

UNITED STATES PATENTS

| Number | Name | Date |
|---|---|---|
| 1,917,258 | Harris | July 11, 1933 |
| 1,970,578 | Schoeller et al. | Aug. 21, 1934 |
| 2,023,075 | Harris | Dec. 3, 1935 |
| 2,299,782 | Allen et al. | Oct. 27, 1942 |
| 2,306,775 | Blair | Dec. 29, 1942 |